(12) United States Patent
Ahn (10) Patent No.: US 11,243,691 B2
(45) Date of Patent: Feb. 8, 2022

(54) METHOD OF PROVIDING INTERACTIVE KEYBOARD USER INTERFACE ADAPTIVELY RESPONDING TO A USER'S KEY INPUT AND SYSTEM THEREOF

(71) Applicant: BITBYTE CORP., Seoul (KR)

(72) Inventor: Seo Hyung Ahn, Bucheon-si (KR)

(73) Assignee: BITBYTE CORP., Seoul (KR)

( * ) Notice: Subject to any disclaimer, the term of this patent is extended or adjusted under 35 U.S.C. 154(b) by 0 days.

(21) Appl. No.: 15/930,050

(22) Filed: May 12, 2020

(65) Prior Publication Data
US 2020/0272328 A1    Aug. 27, 2020

Related U.S. Application Data

(63) Continuation of application No. PCT/KR2018/012605, filed on Oct. 24, 2018.

(30) Foreign Application Priority Data

Nov. 15, 2017   (KR) .......................... 10-2017-0152235

(51) Int. Cl.
*G06F 3/0489*      (2013.01)
*G06F 3/0481*      (2013.01)
(Continued)

(52) U.S. Cl.
CPC ........ *G06F 3/04895* (2013.01); *G06F 3/0481* (2013.01); *G06F 3/04886* (2013.01); *G06F 3/018* (2013.01)

(58) Field of Classification Search
CPC .............. G06F 3/04895; G06F 3/0481; G06F 3/04886; G06F 3/018; G06F 3/0236; G06F 3/0237
See application file for complete search history.

(56) References Cited

U.S. PATENT DOCUMENTS

2008/0114848 A1* 5/2008 Lira
2010/0306683 A1* 12/2010 Pance ................... G06F 3/0237
715/764

(Continued)

FOREIGN PATENT DOCUMENTS

JP      2017045424 A    3/2017
KR    1020100043075 A   4/2010
(Continued)

OTHER PUBLICATIONS

International Search Report of PCT/KR2018/012605 dated Feb. 1, 2019.

*Primary Examiner* — Chad M Dicke
(74) *Attorney, Agent, or Firm* — Dinsmore & Shohl LLP; Yongsok Choi, Esq.; Wisu Sul, Esq.

(57) ABSTRACT

A method of providing an interactive keyboard and a system thereof are provided. The method of providing an interactive keyboard includes a step of causing a user to enter an input to a keyboard system; a step of determining whether the input entering the keyboard system corresponds to a preset action input; and a step of displaying, by the keyboard system, a visual content corresponding to the action input on a key interface, which includes a plurality of keys capable of being selected by the user, in a case where the input is determined as the action input.

7 Claims, 8 Drawing Sheets

(51) Int. Cl.
     *G06F 3/0488*     (2013.01)
     *G06F 3/01*       (2006.01)

(56) References Cited

U.S. PATENT DOCUMENTS

| | | |
|---|---|---|
| 2015/0100537 A1 | 4/2015 | Grieves et al. |
| 2015/0160855 A1* | 6/2015 | Bi ................. G06F 3/0236 715/773 |
| 2016/0034181 A1* | 2/2016 | Norris, III ........ G06F 3/0236 715/773 |
| 2016/0070441 A1* | 3/2016 | Paek |
| 2017/0109780 A1* | 4/2017 | Moore ............ G06Q 30/0269 |

FOREIGN PATENT DOCUMENTS

| | | |
|---|---|---|
| KR | 101214176 B1 | 12/2012 |
| KR | 1020130143268 A | 12/2013 |
| KR | 101528661 B1 | 6/2015 |
| KR | 1020150143989 A | 12/2015 |
| KR | 1020160065174 A | 6/2016 |

* cited by examiner

METHOD OF PROVIDING INTERACTIVE KEYBOARD USER INTERFACE ADAPTIVELY RESPONDING TO A USER'S KEY INPUT AND SYSTEM THEREOF

CROSS-REFERENCE TO APPLICATIONS

This application is a continuation of International Application No. PCT/KR2018/012605 filed on Oct. 24, 2018 which claims priority to Korean Patent Application No. 10-2017-0152235 filed on Nov. 15, 2017, the entire contents of which are herein incorporated by reference.

TECHNICAL FIELD

The present invention relates to a method of providing an interactive keyboard and a system thereof, and more specifically, a method of providing a keyboard adaptively responding to a key input of a user, and a system thereof.

BACKGROUND

Due to an activation of a mobile device and a development of a touch screen, a soft keyboard (keypad) implemented in software has been widely used in addition to a traditional physical keyboard.

As such a soft keyboard is widely utilized, the soft keyboard has been applied and used to have more value than means for simply inputting information.

Figure 1:
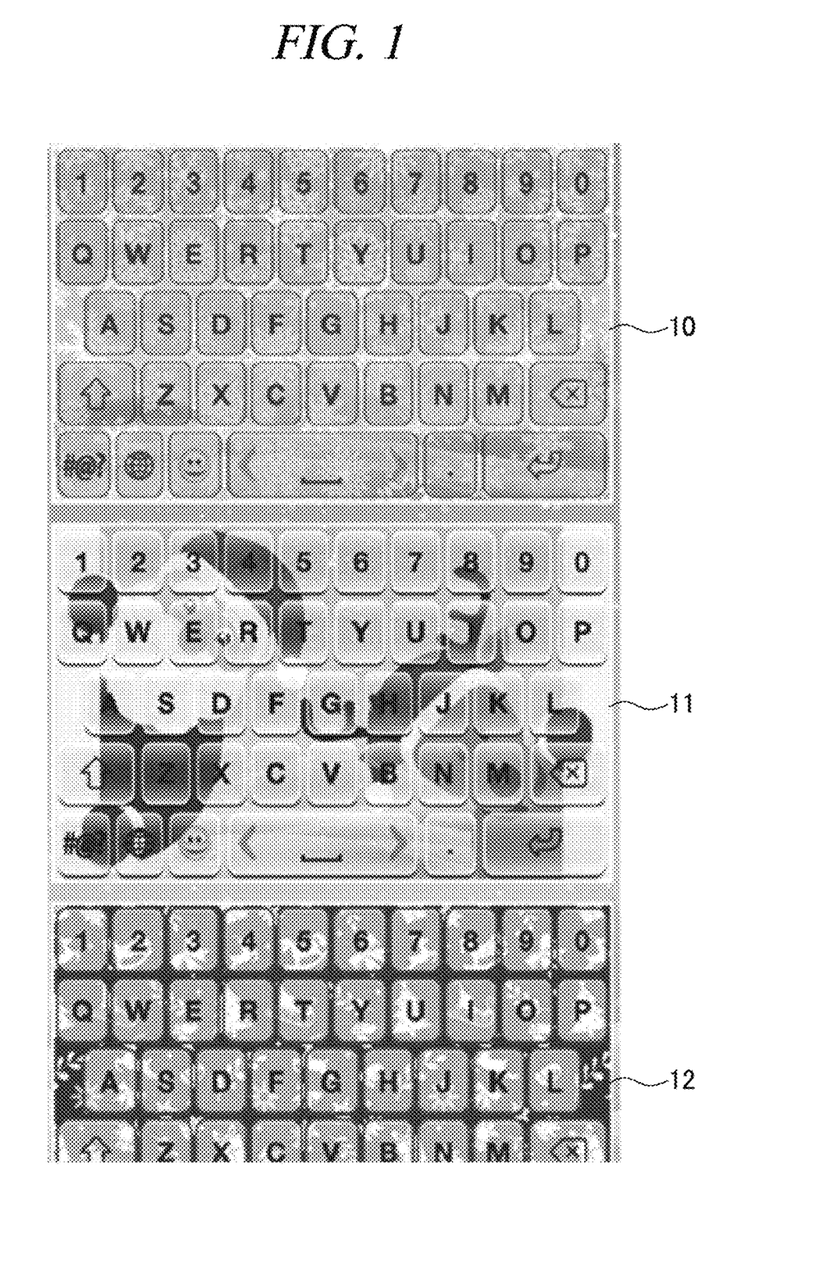
FIG. 1 is a view illustrating an example of a soft keyboard of the related art.

Such an example is illustrated in FIG. 1.

FIG. 1 illustrates a utilizing example of a soft keyboard of the related art.

As illustrated in FIG. 1, soft keyboards (for example, 10 to 12) in which a shape (for example, also called a skin) desired by a user is displayed instead of a uniform soft keyboard supplied by a service providing side have been already used.

However, in the related art illustrated in FIG. 1, there are some aspects that can be changed depending on a preference of the user, but once a background shape (or skin) is set, the background shape is statically provided to the user until the shape is reset.

SUMMARY OF INVENTION

Technical Problem

Accordingly, an object of the present invention is to provide a method of providing an interactive keyboard that responds adaptively according to an input of a user, and a system thereof.

In particular, an object of the present invention is to provide a method and a system thereof in which of a reaction (for example, animation of an object, display of an image, or the like) can be changed according to an input which is entered by a user, and such a reaction can be utilized as an input.

Solution to Problem

According to an aspect of the invention, there is provided a method of providing an interactive keyboard, the method including: a step of causing a user to enter an input to a keyboard system; a step of determining whether the input entering the keyboard system corresponds to a preset action input; and a step of displaying, by the keyboard system, a visual content corresponding to the action input on a key interface, which includes a plurality of keys capable of being selected by the user, in a case where the input is determined as the action input.

The method of providing an interactive keyboard may further include: a step of displaying, by the keyboard system, the visual content on a service interface receiving the input automatically or in a case where a specific key input is performed after a certain time has elapsed after the visual content is displayed on the key interface.

The method of providing an interactive keyboard may further include: a step of displaying, by the keyboard system, a default visual content before the input enters. When the input enters in a state where the default visual content is displayed, the keyboard system may display the visual content.

The step of causing the input to enter the keyboard system from the user may include: a step of executing, by the keyboard system, a predetermined display in which a final key is capable of being distinguished from other keys before a selection of the final key is performed after a selection of a previous key for entering of the input, which is entered by the selection of the final key and at least one previous key entered before the final key by which the input is completed when being selected by the user.

In the step of executing the predetermined display in which the final key is capable of being distinguished from other keys before the selection of the final key is performed, the visual content or a corresponding content corresponding to the visual content may be displayed on a region corresponding to the final key.

The method of providing an interactive keyboard may further include: a step of displaying, by the keyboard system, a recommendation interface displaying a recommendation input before or after completion of the input; and a step of displaying, by the keyboard system, the visual content corresponding to the input on at least a portion of the recommendation interface.

According to another aspect of the invention to solve the technical problem, there is provided a method of providing an interactive keyboard, the method including: a step of causing a user to enter an input to a keyboard system; a step of determining whether the input entering the keyboard system corresponds to a preset action input; and a step of displaying a visual content corresponding to the action input on a predetermined interface provided by the keyboard system automatically, even if no additional key selection is performed when the entering of the input is completed, in a case where the input is determined as the action input.

According to another aspect of the invention to solve the technical problem, there is provided a method of providing an interactive keyboard, the method including: a step of displaying, by a keyboard system, a recommendation interface displaying a recommendation input before or after completion of entering of a predetermined input to be entered by a user from the user; a step of displaying, by the keyboard system, a visual content corresponding to the input on at least a portion of the recommendation interface; and a step of displaying, by the keyboard system, the visual content on a service interface receiving the input when the displayed visual content is selected.

The methods described above may be implemented by a computer program installed in a data processing apparatus.

According to another aspect of the invention to solve the technical problem, there is provided an interactive keyboard system including: an interface module that provides a key interface including a plurality of keys capable of being selected by a user; a determination module that determines whether an entered input corresponds to a preset action input when the user enters the input; and a control module that causes the keyboard system to display a visual content corresponding to the action input on the key interface in a case where the input is determined as the action input.

According to another aspect of the invention to solve the technical problem, there is provided an interactive keyboard system including: an interface module that provides a key interface including a plurality of keys capable of being selected by a user; a determination module that determines whether an entered input corresponds to a preset action input when the user enters the input; and a control module that displays a visual content corresponding to the action input on a predetermined interface provided by the keyboard system automatically when entering of the input is completed even if no additional key selection is performed, in a case where the input is determined as the action input.

According to another aspect of the invention to solve the technical problem, there is provided an interactive keyboard system including: an interface module that displays a recommendation interface displaying a recommendation input before or after completion of entering of a predetermined input to be entered by a user from the user; and a control module that displays a visual content corresponding to the input on at least a portion of the recommendation interface. The control module displays the visual content on a service interface receiving the input when the displayed visual content is selected.

Advantageous Effects

According to an example of the present invention, a reaction (display of a visual content) occurs on a key interface which is used by a user and has high attention. Therefore, there is an effect that attention of the user and the pleasure of use are doubled.

In addition, this reaction can be used as input data (for example, an emoticon, or the like) to be entered by the user, so that an intuitive and effective input can be made compared to a case where the visual content is input on the soft keyboard of the related art.

In addition, by distinguishing and displaying a final key of a specific action input, there is an effect to provide the user with convenience to confirm the existence of the visual content and to enter the visual content.

DETAILED DESCRIPTION OF THE EMBODIMENTS

Hereinafter, examples of the present invention will be described in detail with reference to the accompanying drawings so that those skilled in the art to which the present invention pertains can easily practice. However, the present invention can be implemented in many different forms and is not limited to the examples described herein. In addition, in order to clearly describe the present invention in the drawings, portions irrelevant to the description are omitted, and similar reference numerals are assigned to similar portions throughout the specification.

Throughout the specification, when a portion is "connected" to another portion, this includes not only "directly connected" but also "electrically connected" with another element therebetween. Also, when a portion is said to "include" a certain configuration element, it means that the portion may further include the other configuration element, not exclude the other configuration element, unless specifically stated otherwise. It should be understood that one or more features, numbers, steps, operations, configuration elements, parts, or combinations thereof are not excluded in advance.

The following examples are detailed descriptions to help understanding of the present invention, and do not limit the scope of the present invention. Therefore, a same scope of the invention performing a same function as that of the present invention will also belong to the scope of the present invention.

The present invention can be applied to various transformations and can have various examples, and specific examples will be illustrated in the drawings and described in detail in the detailed description. However, this is not intended to limit the present invention to specific examples, and should be understood to include all conversions, equivalents, and substitutes included in the spirit and scope of the present invention. In the description of the present invention, when it is determined that a detailed description of the known technique related to the present invention may obscure the subject matter of the present invention, the detailed description thereof will be omitted.

Terms such as first and second may be used to describe various configuration elements, but the configuration elements should not be limited by the terms. The terms are used only for the purpose of distinguishing one configuration element from another configuration element.

Terms used in the present application are only used to describe specific examples and are not intended to limit the present invention. Singular expressions include plural expressions unless the context clearly indicates otherwise.

In the present specification, terms such as "include" and "have" are intended to indicate that there are features, numbers, steps, operations, configuration elements, parts, or combinations thereof described on the specification. It should be understood that one or more features, numbers, steps, operations, configuration elements, parts, or combinations thereof are not excluded in advance.

In addition, in the present specification, in a case where one configuration element 'transmits' data to another configuration element, it means the one configuration element may directly transmit the data to the other configuration element, or transmit the data to the other configuration element through at least further another configuration element. Conversely, in a case where one configuration element 'directly transmits' data to another configuration element, it means that the data is transmitted from the one configuration element to the other configuration element without passing through the further other configuration element.

Hereinafter, the present invention will be described in detail with reference to the accompanying drawings. The same reference numerals in each drawing denote the same members.

Figure 9:
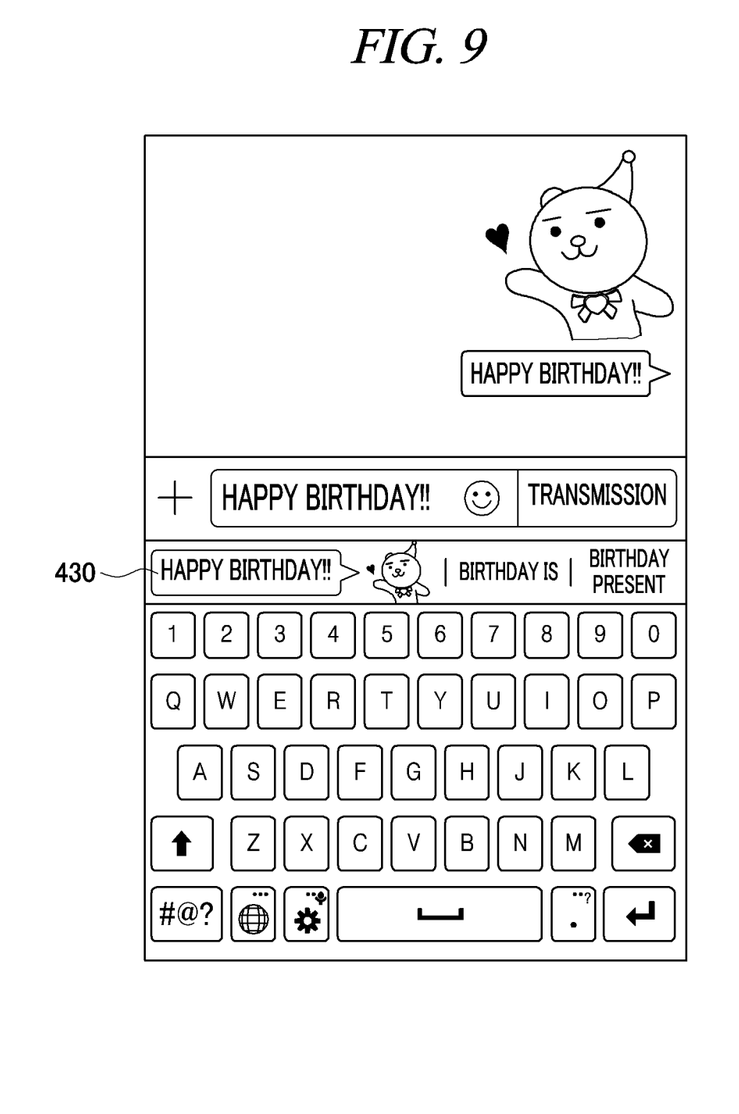
FIG. 9 is a view for explaining an example in which a visual content is displayed according to an example of the present invention.

A video editing method according to the technical idea of the present invention may have a concept as illustrated in FIG. 1 when compared with a method of the related art in FIG. 9.

Figure 2:
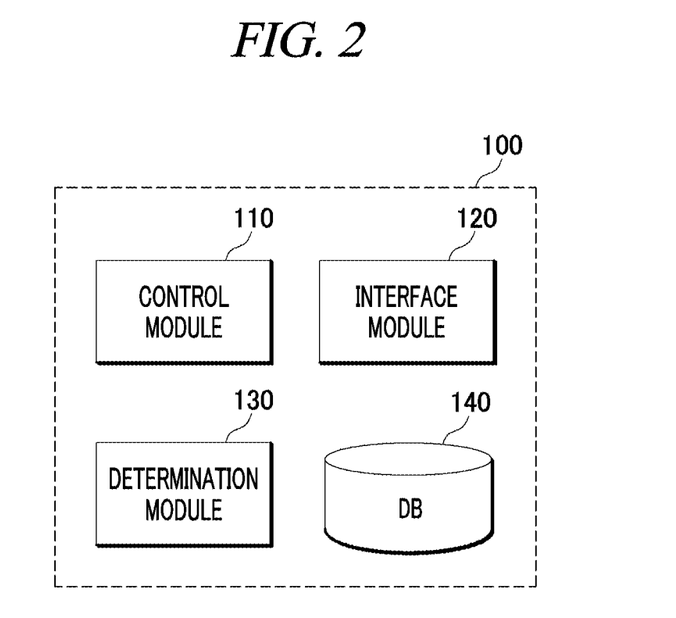
FIG. 2 is a diagram for explaining a schematic configuration of a keyboard system according to an example of the present invention.

FIG. 2 is a diagram for explaining a schematic configuration of a keyboard system according to an example of the present invention.

Referring to FIG. 2, a keyboard system 100 may be provided to implement a method of providing an interactive keyboard according to the technical idea of the present invention.

The keyboard system 100 may be a system installed in a terminal of a predetermined user. The keyboard system 100 may be a system that is installed in the terminal and is implemented by organically combining software (for example, an application) implemented to implement the technical idea of the present invention and hardware of the terminal for driving the software.

The terminal is mainly described as a smart phone or a smart device in the examples of the present invention but may be implemented as any data processing device capable of implementing functions defined in the present specification. For example, the terminal may be a data processing device possessed or occupied by a user, such as a smart phone, a tablet PC, a laptop, a desktop, a mobile terminal, a PMP, or a PDA. In addition, the terminal may be any device as long as the device can implement a software keyboard according to the technical idea of the present invention.

The keyboard system 100 may be installed in the terminal as described above. The keyboard system 100 may be implemented by installing the software on the terminal.

The keyboard system 100 may receive a selection (for example, touch, long press, drag, specific gesture, swipe, or the like) of the user through a predetermined touch pad provided in the terminal.

The keyboard system 100 may include a control module 110, an interface module 120, and a determination module 130. The keyboard system 100 may further include a predetermined DB 140. According to the example of the present invention, some of the configuration elements may not necessarily correspond to configuration elements essential to the implementation of the present invention. In addition, according to the example, of course, the keyboard system 100 may include more configuration elements than those of the example.

The keyboard system 100 may include a hardware resource and/or software necessary to implement the technical idea of the present invention and does not necessarily mean one physical configuration element or one device. That is, the keyboard system 100 may mean a logical combination of hardware and/or software provided to implement the technical idea of the present invention, and if necessary, is installed in devices spaced apart from each other to perform each function. Therefore, the keyboard system 100 may be implemented as a set of logical configurations for implementing the technical idea of the present invention.

In addition, in the present specification, a module may mean a functional and structural combination of hardware for performing the technical idea of the present invention and software for driving the hardware. For example, the module may mean a logical unit of a predetermined code and a hardware resource for performing the predetermined code. It can be easily deduced from an average expert in the technical field of the present invention that the module does not necessarily mean a physically connected code or a type of hardware.

The control module 110 can control functions and/or resources of other configurations (for example, the interface module 120, the determination module 130, and/or the DB 140, and the like) included in the keyboard system 100.

The interface module 120 may provide an interface according to the technical idea of the present invention and may be provided in the terminal.

The interface provided by the interface module 120 may include, for example, a key interface and a service interface. The key interface may include a recommendation interface and an input window interface. As described above, an example of the interface provided by the interface module 120 will be described below with reference to FIGS. 3 and 4.

The determination module 130 may determine whether or not an input entered from the user is an input to which a predetermined reaction (for example, display of a predetermined visual content) has to be performed. As described above, an input configured to react in advance among inputs of the user is defined as an action input. Then, the determination module 130 can determine whether the input of the user is the action input.

In a case where the determination module 130 determines that the input of the user is the action input, the control module 110 may display the predetermined visual content. That is, the reaction can be performed.

The visual content may be, for example, an image (for example, an icon, an emoticon, or the like) or a video. Alternatively, the visual content may be a content that is displayed as if a predetermined object (for example, a character) performs a predetermined operation, such as a so-called moving emoticon. In any case, the visual content may be visually recognizable content predetermined to correspond to an action input.

This visual content may be a content defined to correspond to the meaning or context of the input. That is, as the content related to the meaning of the input entered from the user, it can be associated with the meaning of the input in various ways, for example, by indicating the meaning, expressing the meaning, or implying the meaning.

In addition, such a visual content may be stored in the predetermined DB 140.

The DB 140 may mean a data storage medium and/or a data storage structure storing the visual content. In FIG. 2, the DB 140 is illustrated as being included in the keyboard system 100, but according to an example, the DB 140 may be provided on a server side and the keyboard system 100 having other configurations except the DB 140 may be included in the terminal. In this case, the keyboard system 100 may be software (and hardware for driving the software) defined to perform a function thereof in a server-client structure.

A correspondence relationship between the visual content and the action input may be previously defined by a service providing side. In addition, the visual content and the action input are not necessarily matched 1:1, and if necessary, a plurality of action inputs may correspond to one visual content, or a plurality of visual contents may correspond to one action input.

According to the technical idea of the present invention, the control module 110 may perform a reaction according to what the input is when the user enters the input through a predetermined interface provided by the keyboard system 100 in various ways. That is, it is possible to display the visual content.

The control module 110 may display the visual content on a predetermined interface provided by the keyboard system 100. When the entering of the action input is completed, the control module 110 may automatically and immediately display the visual content corresponding to the action input even if no other key or menu selection is performed. According to an example, the control module 110 may display the visual content on the key interface.

Since the key interface is an interface in which a key capable of being selected by the user is displayed, it may be a region of interest to the user. By displaying the visual content in such a region, there is an effect that the user further focuses/attends the visual content.

According to another example, the control module 110 may display the visual content on a recommendation interface. The recommendation interface may be an interface for displaying a recommendation keyword. Unlike the recommendation keyword which is a text of the related art, that is, a keyword that is assumed when a current input is completed is recommended, according to the technical idea of the present invention, the control module 110 may display the visual content on the recommendation interface displaying the recommendation keyword. Through this, compared to the need to select a separate menu interface for selecting the visual content (for example, the emoticon, or the like) that has been widely used in the related art, there is an effect that the visual content of can be selected much more effectively.

Moreover, since the visual content is a content that is selected and displayed to be matched with the corresponding input entered by the current user, compared to a case where the user simply selects any one from a plurality of visual contents through the menu interface, there is an effect that the selection of the content desired by the user can be very quickly performed.

Meanwhile, the response of the keyboard system 100, that is, the display of the visual content may vary according to the input.

The reaction of the keyboard system 100 may mean an action and/or reaction in a relationship between the keyboard system 100 and the user who uses the keyboard system 100.

In addition, as described above, the keyboard system 100 may allow the reaction provided to the user to be provided to a third party (for example, another user in conversation with the user, a third party used by the user, or the like).

For example, when the user enters the action input to the keyboard system 100, the keyboard system 100 allows the user to perform a reaction for displaying the visual content corresponding to the action input.

Such a reaction can be automatically or alternatively delivered by the user to a third party. For example, the visual content 400 illustrated in FIG. 6 may be a result of responding to the user who enters a specific action input (for example, "good") to the keyboard system 100. Such a reaction may be a reaction performed when the specific action input is entered by the user regardless of a service or action currently being performed.

However, the user may want to provide the reaction which is performed by himself/herself to the third party. For example, in a case where the keyboard system 100 is used as an input tool of messenger software in connection with predetermined messenger software, the user may transmit the reaction to a third party in conversation with himself/herself through the messenger software.

In this case, the reaction is more than whether the keyboard system 100 simply responds according to some input, that is, may have an effect of being used as a tool that can promptly and easily notice, and easily select a content to be delivered to a third party.

For example, in the related art, in a case where a predetermined visual content (for example, the emoticon) is to be delivered to a third party, the user has to perform a selection of a menu capable of selecting an emoticon to select the emoticon regardless of the entering of the action input, a series of selection actions to select a desired emoticon in the menu, or the like.

However, according to the technical idea of the present invention, when the user enters the action input, the visual content corresponding to the action input is immediately displayed, and if the displayed visual content is desired to be delivered to the third party, a predetermined action (for example, selection of a specific button or the like) may be performed or may be automatically delivered to the third party without a specific action depending on an example. In this case, not only it is very convenient in the selection of the visual content but also there is an effect that the visual content can be delivered after the user confirms the visual content to be delivered immediately and intuitively.

Of course, even if the visual content is not delivered to the third party, the present invention also has an effect of giving the pleasure of having a conversation between the keyboard system 100 and the user through a reaction between the user and the keyboard system 100.

Figure 3:
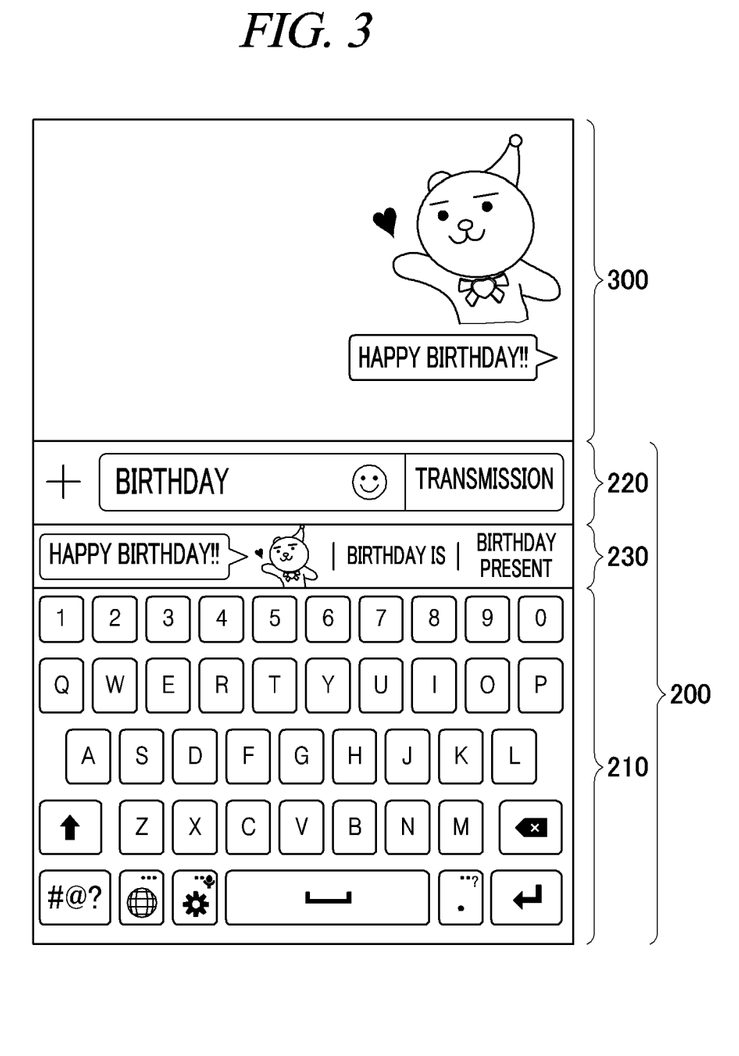
FIG. 3 is a view for explaining an interface used by the keyboard system according to an example of the present invention.
Figure 4:
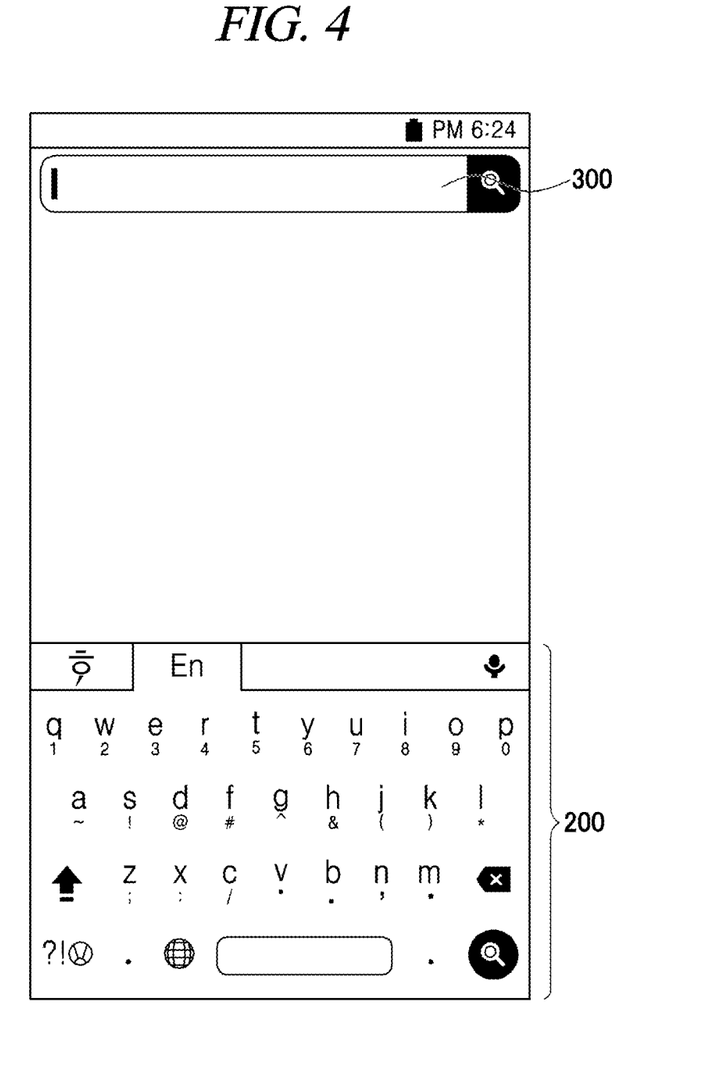
FIG. 4 is a view for explaining an interface used by the keyboard system according to an example of the present invention.

The interface module 120 of the keyboard system 100 for implementing the technical idea may provide interfaces as described in FIGS. 3 and 4.

FIGS. 3 and 4 are views illustrating the interfaces used by the keyboard system according to an example of the present invention.

First, referring to FIG. 3, the keyboard system 100 may provide a key interface 200 to a terminal.

As illustrated in the drawing, the key interface 200 may include a key region 210 and an input window interface 220. According to an implementation example, the interface module 120 may further display a recommendation interface 230 on the key interface 200.

The key region 210 may be a region where a plurality of keys for the user to enter the input through a key are displayed. In the key region 210, a QWERTY keypad method has been widely used for the arrangement of keys, but in the mobile terminal, the arrangement of keys are arranged in various ways depending on a keypad manufacturer. The technical idea of the present invention is not affected by the arrangement of keys displayed on the key region 210, and various examples may be possible.

Meanwhile, the input window interface 220 may be a region in which the user can display a series of selection results selected through the key displayed on the key region 210 or paste information stored in a clipboard provided by an OS.

The determination module 130 according to the technical idea of the present invention may determine whether the keyword displayed on the input window interface 220 is the input action. That is, the input action defined according to the technical idea of the present invention does not necessarily need to be input through the key region 210 but may be copied from the outside and copied to the input window interface 220.

Meanwhile, the recommendation interface 230 may be a region in which the recommendation keyword is provided. The recommendation interface may be an interface on which a keyword predicted to be a keyword desired by the user to enter based on the current input, that is, the recommendation keyword is displayed. Such a recommendation interface 230 is widely used in the related art. However, in the related art, only the recommendation keyword, which is the text, is displayed on the recommendation interface 230, but according to the technical idea of the present invention, there is a difference in that visual content corresponding to the action input is displayed.

In addition, in a case where the recommendation keyword is determined as the input action not only in a state where the input of the input action is completed by the user but also even before the input of the input action is completed, the visual content may be automatically displayed on the recommendation interface.

Meanwhile, the interface module 120 of the keyboard system 100 may further provide a service interface 300. The service interface 300 may be an interface in which a service (where the service may be an application, a function, or a class, a web page, or the like according to an example, and various examples can be provided). An example may be possible) that is a purpose of the input entering the keyboard system 100, that is, a service that is a purpose of delivering the input is provided.

The service interface 300 may be provided by the keyboard system 100 itself or may be provided separately by the service side. That is, the key interface 200 provided by the keyboard system 100 may have a different provider from that of the service interface 300.

For example, in FIG. 3, the interfaces used in a so-called messenger application are illustrated. In this case, the input entered through the key interface 200 may be delivered to the service side and displayed on the service interface 300. In this case, the service interface 300 may be an interface provided by the service side for conversation or communication with the third party separate from the user. In general, in the case of such a messenger application, the key interface 200 and the service interface 300 are often provided by the messenger application, but according to an example, a keypad other than the keypad set by the messenger application as the default such as the system keypad may be acceptable to use. In this case, the key interface 200 and the service interface 300 may be different software provided by different subjects.

According to another example, the service interface 300 may be a search input window 300 as illustrated in FIG. 4. In this case, the search input window 300 may be the service interface 300. That is, the input entered through the key interface 200 is delivered to the search input window, so that the search input window provided by a side providing the search service may be the service interface 300.

In any case, the keyboard system 100 may provide at least the key interface 200 and deliver input entered through the key interface 200 to the service interface 300. According to the implementation example, as described above, the keyboard system 100 may provide the service interface 300 itself.

Examples of performing the entering and the response of the input, that is, the display of the visual content through these various interfaces will be described with reference to FIGS. 5 to 9.

FIGS. 5 to 9 are views for explaining an example in which the visual content is displayed according to an example of the present invention.

Figure 5:
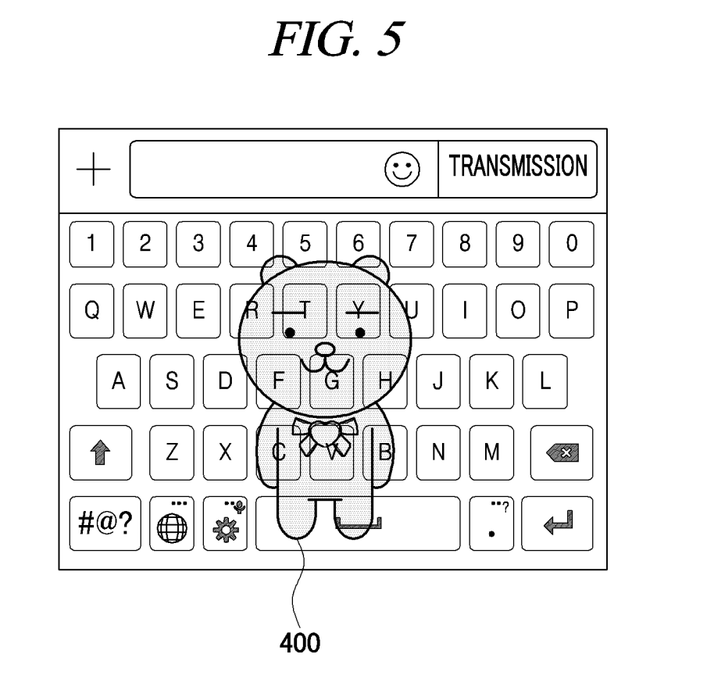
FIG. 5 is a view for explaining an example in which a visual content is displayed according to an example of the present invention.

First, referring to FIG. 5, a function according to the technical idea of the present invention may be enabled or disabled according to a selection of the user.

In addition, the keyboard system 100 may display a predetermined visual content 400 as the default before a specific input is entered or before the action input is entered.

Hereinafter, the present specification exemplifies a case where the content related to a still video or a moving video (or a video performing an animation function, a moving emoticon, or the like) of a predetermined object (for example, a bear character) as illustrated in the drawing is the visual content. However, it can be easily inferred by the average expert in the technical field of the present invention that the example of the visual content can be changed variously.

Figure 6:
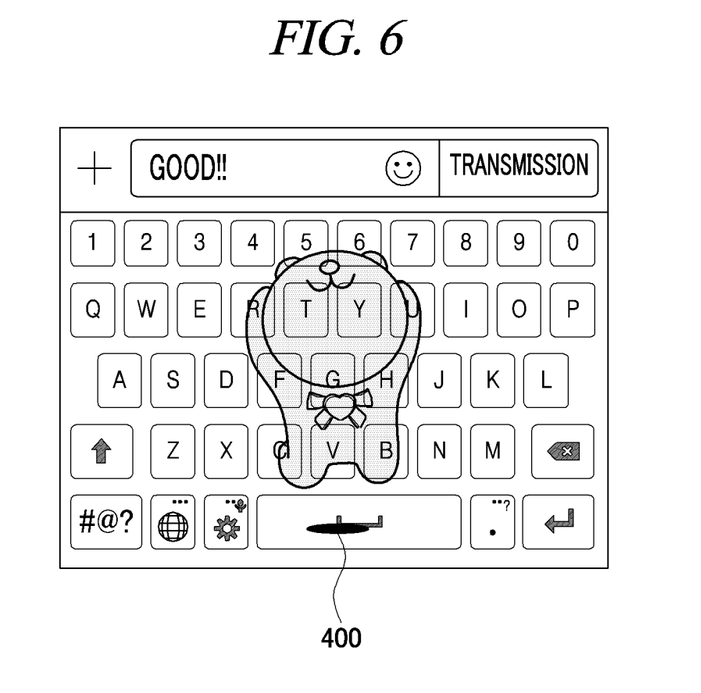
FIG. 6 is a view for explaining an example in which a visual content is displayed according to an example of the present invention.

In this state, the user can enter a predetermined input (for example, 'good'). Then, the determination module 130 of the keyboard system 100 may determine whether the input is the action input. In addition, the input may be predefined as the action input, and accordingly, the visual content 400 corresponding to the input may be as illustrated in FIG. 6. The visual content 400 illustrated in FIG. 6 may be a moving character, and the visual content 400 associated with the meaning or context of the keyword 'good' (for example, performing a jumping action because the character is happy) may be previously stored in the DB (140) correspondingly.

Of course, the visual content 400 corresponding to the input may be displayed on the recommendation interface 230 in a state where only a word (for example, 'goo') is entered before the entering of the input is completed.

Also, as illustrated in FIG. 6, the keyboard system 100 may display the visual content 400 on the key interface 200. In particular, by displaying the visual content 400 on the key region 210, an effect of increasing the attention of the user may exist.

Figure 7:
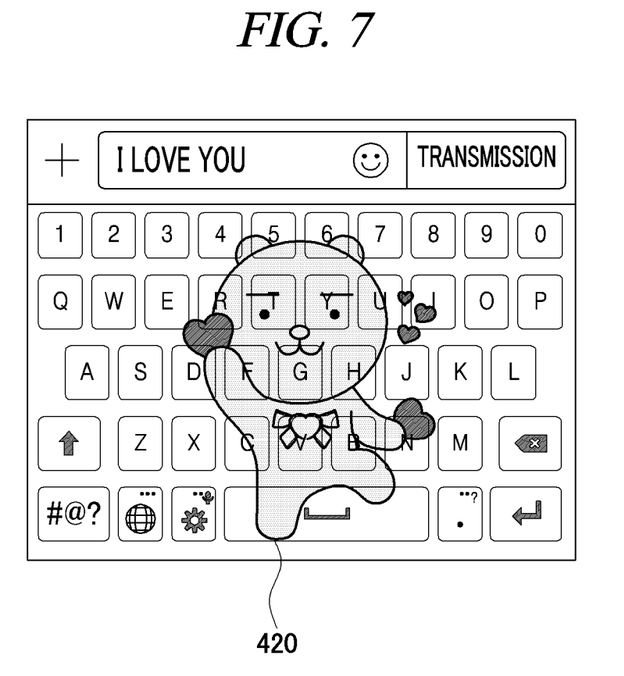
FIG. 7 is a view for explaining an example in which a visual content is displayed according to an example of the present invention.

According to another example, as illustrated in FIG. 7, the user may input a second input (for example, "I love you") through the key interface 200. The second input (for example, 'I love you') may also be the action input. Then, as illustrated in FIG. 7, the control module 110 may display a visual content 420 corresponding to the second input (for example, 'I love you'). The visual content 420 may also be a moving emoticon.

The visual contents (for example, 400 and 420) displayed on the key interface 200 may be simply displayed for the user using the keyboard system 100. However, according to another example, the visual contents (for example, 400 and 420) may be transmitted to the service side. For example, the visual contents (for example, 400 and 420) may be delivered to the service interface 300.

According to an example, in the key interface 200, the visual contents (for example, 400 and 420) may be delivered to the service interface 300 to be displayed after a certain time has elapsed after the visual contents (for example, 400 and 420) are displayed.

Alternatively, in a case where a specific key enters after being displayed on the key interface 200, the visual content may be delivered to the service interface 300 receiving the input to be displayed.

In this case, there is an effect of entering the visual content much simpler than a series of actions that the user has to perform to input the visual content (for example, the emoticon, or the like) of the related art. Alternatively, the user can intuitively check whether the content is desired before entering the visual content and then enters the content.

Figure 8:
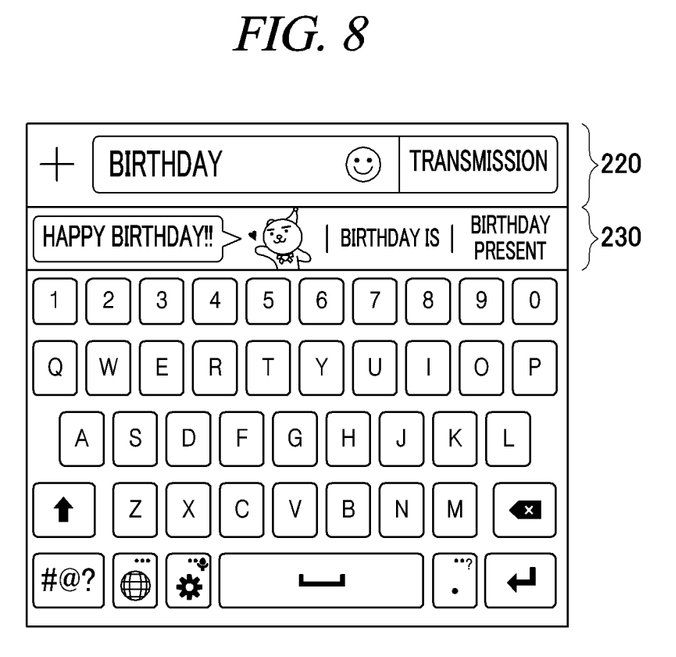
FIG. 8 is a view for explaining an example in which a visual content is displayed according to an example of the present invention.

Meanwhile, FIG. 8 is a view for explaining an example of displaying the visual contents (for example, 400 and 420) on the recommendation interface 230. As illustrated in FIG. 8, the determination module 130 included in the keyboard system 100 may determine whether the present entered input itself is the action input or the recommendation keyword of the input is the action input. In addition, as a result of the determination, in a case where the input or the recommendation keyword of the input is the action input, the visual content corresponding to the action input may be displayed on the recommendation interface 230. Of course, when the user selects the visual content displayed on the recommendation interface, the visual content may be delivered to the service interface 300.

For example, as illustrated in FIG. 8, the user may enter an input 'birthday' through the key interface 200. Then, the input of 'birthday' may be displayed on the input window interface 220. The determination module 130 may determine whether the input entered to the input window interface 220 is the action input or whether there is the action input among the recommendation keywords of the input.

For example, in the example of FIG. 8, it is assumed that 'birthday' itself is not the action input, but 'happy birthday' is the action input. Even in such a case, when the user enters 'birthday', 'happy birthday' may be selected as the recommendation keyword through a predetermined method, and the selected recommendation keyword may be the action input. Then, as illustrated in FIG. 8, the recommendation keyword, that is, the visual content corresponding to the action input may be displayed on the recommendation interface.

Of course, even in a case where the visual content is displayed on the recommendation interface, a text recommendation keyword may be separately displayed on the recommendation interface.

Referring to FIG. 9, in a case where the user selects a visual content (for example, 430) displayed on the recommendation interface, as illustrated in FIG. 9, the visual content (for example, 430) may be delivered to the service interface 300 to be displayed.

On the other hand, according to the technical idea of the present invention, the keyboard system 100 allows the user to recognize that there is the visual content related to the input currently being entered, and may provide a technical idea to use the keyboard system 100 for fun. Such an example will be described with reference to FIG. 10.

Figure 10:
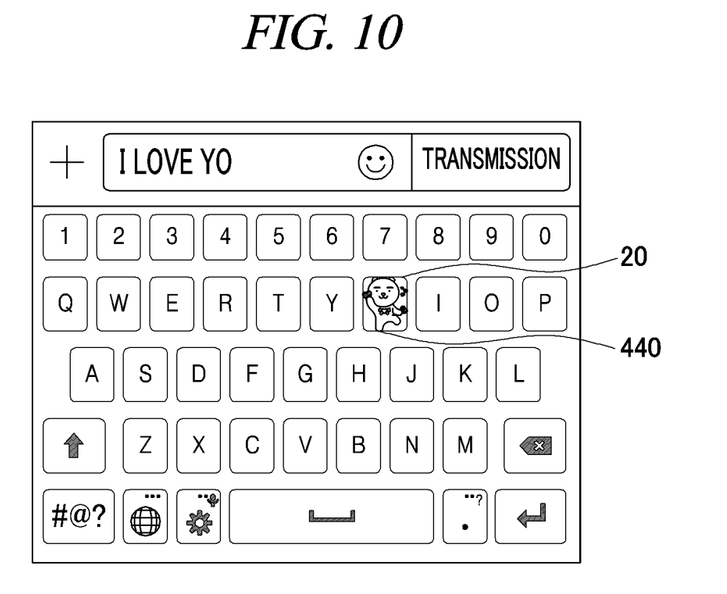
FIG. 10 is a view for explaining an example of displaying the visual content in a region corresponding to a final key according to an example of the present invention.

FIG. 10 is a view for explaining an example of displaying the visual content in a region corresponding to the final key according to an example of the present invention. Referring to FIG. 10, the keyboard system 100 according to the technical idea of the present invention may provide a function of displaying a key to complete the action input, that is, the final key to be distinguished from other keys.

That is, assuming that the input to be entered by the user is the action input, the entering of the action input may be completed by entering (selecting) the final key through the key interface 200. In this case, the user may face a moment for finally selecting the final key after entering at least one previous key.

For example, as illustrated in FIG. 10, the input that the user intends to input may be "I love you", and the input may be the action input.

In this case, the user can enter "I love you" by entering 'I love yo' and finally entering a word 'u' as the final key.

At this time, the determination module 130 may determine whether there is the final key at each time point (that is, entrance completion of the action input is performed by one key input). In addition, in a case where there is the final key, the control module 110 may display the final key distinguished from other keys existing in the key region 210.

According to an example, the control module 110 may also use visual content 430 corresponding to the action input (for example, 'I love you') that is completed when the final key is input to display the final key distinguished from other keys. Of course, the final key may be distinguished from other keys in various other ways, for example, the final key may be distinguished from other keys in color, an object pointing to the final key may be displayed, and the like.

According to an example, the control module 110 may display a corresponding content 440 corresponding to the visual content 430 in a region (for example, an inside of the final key or the like) corresponding to the final key. The corresponding content corresponding to the visual content may be the visual content itself or a content derived from the visual content. For example, in a case where the visual content is the moving emoticon, the corresponding content may be a still image at a specific time point of the moving emoticon.

In this case, there is an effect that the user can intuitively and noticeably recognize that the visual content is displayed or the visual content exists as the entrance of the final key. Through this, the user may be interested in the use of the keyboard system 100, and there is an effect that the entrance of various visual content can be used naturally and effectively at a right time and right place, without the text-based input.

According to an implementation example, the keyboard system 100 may include a processor and a memory storing a program executed by the processor. The processor may include a single-core CPU or a multi-core CPU. The memory may include a high-speed random access memory and may include a non-volatile memory such as one or more magnetic disk storage devices, flash memory devices, or other non-volatile solid-state memory devices. Access to a memory by a processor and other configuration elements can be controlled by a memory controller. Here, in a case where the program is executed by the processor, the keyboard system 100 according to the present example may perform the method of providing the interactive keyboard described above.

Meanwhile, the method of providing the interactive keyboard according to the example of the present invention may be implemented in a form of a computer-readable program command and stored in a computer-readable recording medium, and a control program and a target program according to the example of the present invention can also be stored in a computer-readable recording medium. The computer-readable recording medium includes any kind of recording device in which data readable by a computer system is stored.

The program command recorded in the recording medium may be specially designed and constructed for the present invention or may be known and usable by those skilled in the software art.

Examples of the computer-readable recording media include magnetic media such as a hard disk, a floppy disk, and a magnetic tape, optical media such as a CD-ROM and a DVD, and magneto-optical media such as a floptical disk, and hardware devices specifically configured to store and execute program commands such as a ROM, a RAM, and a flash memory. The computer-readable recording medium can also be distributed to computer systems connected via a network, so that a computer readable code is stored and executed in a distributed manner.

Examples of program commands include a machine language code such as one produced by a compiler, and a high-level language code that can be executed by a device that processes information electronically using an interpreter or the like, for example, a computer.

The hardware device described above may be configured to operate as one or more software modules to perform the operation of the present invention, and vice versa.

The description of the present invention described above is for illustration only, and those skilled in the art to which the present invention pertains can understand that it can be easily modified to other specific forms without changing the technical spirit or essential features of the present invention. Therefore, it should be understood that the examples described above are illustrative in all respects and not restrictive. For example, each configuration element described as a single type may be implemented in a distributed manner, and similarly, configuration elements described as the distributed manner may be implemented in a combined form.

The scope of the present invention is indicated by the following claims rather than the detailed description described above, and all changes or modifications derived from the meaning and scope of the claims and their equivalent concepts should be interpreted to be included in the scope of the present invention.

What is claimed is:

1. A method of providing an emoticon based on an interactive keyboard, the method comprising:
    displaying, by the keyboard system, a key interface which includes a plurality of keys capable of being selected by a user,
    causing, by a keyboard system, the user to enter an input to the keyboard system;
    determining, by the keyboard system, whether the input entering the keyboard system corresponds to an action input;
    displaying, by the keyboard system, a default visual content including an emoticon;
    displaying, by the keyboard system, a visual content including an emoticon corresponding to the action input on the key interface in a state where the default visual content is displayed in a case where the input is determined as the action input; and
    outputting, by the keyboard system, the visual content on a service interface indicating a message window automatically or in a case where a specific key input is performed, after a certain time has elapsed after the visual content is displayed on the key interface,
    wherein the visual content is an image or a video content being changed according to the action input and corresponding to a meaning or context of the action input,
    wherein the visual content is displayed on at least one key in a state where the at least one key included in the key interface is displayed,
    wherein the visual content is displayed translucently on the key interface and more largely than one key,
    wherein the image or the video content includes an static or dynamic emoticon, and the static or dynamic emoticon moves to perform an action corresponding to the meaning of the action input or is an object related to the meaning of the action input,
    wherein in response to a final key of the action input being entered and the action input becoming a complete word or context having a meaning, the visual content is displayed, and
    wherein the plurality of action inputs correspond to one visual content.

2. The method of providing an emoticon based on an interactive keyboard according to claim 1,
    wherein the causing the user to enter the input to the keyboard system includes:
    executing, by the keyboard system, a predetermined display in which a final key is capable of being distinguished from other keys before a selection of the final key is performed after a selection of a previous key for entering of the input, which is entered by the selection of the final key and at least one previous key entered before the final key by which the input is completed when being selected by the user.

3. The method of providing an emoticon based on an interactive keyboard according to claim 2,
    wherein in the executing the predetermined display in which the final key is capable of being distinguished from other keys before the selection of the final key is performed,
    another visual content or a corresponding content corresponding to the another visual content is displayed on a region corresponding to the final key.

4. The method of providing an emoticon based on an interactive keyboard according to claim 1, further comprising:
    displaying, by the keyboard system, a recommendation interface displaying a recommendation input before or after completion of the input; and
    displaying, by the keyboard system, the visual content corresponding to the input on at least a portion of the recommendation interface.

5. A computer program installed in a data processing apparatus and recorded on a recording medium for performing the method according to claim 1.

6. A data processing apparatus comprising:
    a processor; and
    a memory storing a computer program executed by the processor,
    wherein in a case where the computer program is executed by the processor, the method according to claim 1 is executed.

7. The method of providing an emoticon based on an interactive keyboard according to claim 1, wherein:
    the key interface includes an input window interface configured to display a series of selection results selected through the plurality of keys; and
    the service interface is displayed in an area different from an area where the key interface is displayed.

* * * * *